US011829135B2

(12) United States Patent
Voznesensky et al.

(10) Patent No.: US 11,829,135 B2
(45) Date of Patent: Nov. 28, 2023

(54) TUNING AUTONOMOUS VEHICLE DISPATCH USING VEHICLE PERFORMANCE

(71) Applicant: Uber Technologies, Inc., San Francisco, CA (US)

(72) Inventors: Michael Voznesensky, San Francisco, CA (US); Brent Goldman, San Francisco, CA (US); Mark Yen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 333 days.

(21) Appl. No.: 16/698,061

(22) Filed: Nov. 27, 2019

(65) Prior Publication Data

US 2020/0166936 A1 May 28, 2020

Related U.S. Application Data

(60) Provisional application No. 62/772,420, filed on Nov. 28, 2018.

(51) Int. Cl.
*G05D 1/00* (2006.01)
*G01C 21/34* (2006.01)
*G06Q 30/0282* (2023.01)

(52) U.S. Cl.
CPC ............ *G05D 1/0088* (2013.01); *G01C 21/34* (2013.01); *G05D 2201/0213* (2013.01); *G06Q 30/0282* (2013.01)

(58) Field of Classification Search
CPC ............ G01C 21/3423; G01C 21/3461; G01C 21/3484; G06Q 10/02; H04W 12/06; G05D 1/0297; G05D 1/0088
(Continued)

(56) References Cited

U.S. PATENT DOCUMENTS 3,825,265 A 7/1974 Pitkanen et al.
7,542,882 B2 * 6/2009 Agrawala ............ G01C 21/367
703/2
(Continued)

FOREIGN PATENT DOCUMENTS

WO 2020112799 6/2020
WO 2020113038 6/2020

OTHER PUBLICATIONS

"International Application Serial No. PCT US2019 063654, International Search Report dated Feb. 4, 2020", 4 pgs.
(Continued)

*Primary Examiner* — Abhishek Vyas
*Assistant Examiner* — Sanjeev Malhotra
(74) *Attorney, Agent, or Firm* — SCHWEGMAN LUNDBERG & WOESSNER, P.A.

(57) ABSTRACT

Various examples described herein are directed to systems and methods for dispatching trips to a plurality of autonomous vehicles. For example, a dispatch system may access trip result data describing a plurality of trips executed by a set of autonomous vehicles of a first vehicle type. The dispatch system may determine a first routing constraint for autonomous vehicles of the first vehicle type using the trip result data and select an autonomous vehicle to execute a first new trip using the first routing constraint. The dispatch system may send a request to execute the first new trip to the selected autonomous vehicle.

20 Claims, 7 Drawing Sheets

(58) Field of Classification Search
USPC .......... 701/2, 14, 22, 25, 1, 19; 700/28; 704/270.1; 180/167; 703/2; 340/901; 455/457

See application file for complete search history.

(56) References Cited

U.S. PATENT DOCUMENTS

| | | | | |
|---|---|---|---|---|
| 7,603,235 | B2* | 10/2009 | Makela | G05D 1/028 340/901 |
| 7,840,287 | B2* | 11/2010 | Wojsznis | G05B 13/048 703/2 |
| 8,126,604 | B2* | 2/2012 | McGrogan | B60W 30/1846 701/1 |
| 8,295,993 | B2* | 10/2012 | Kumar | B61L 25/026 701/19 |
| 8,498,871 | B2* | 7/2013 | Miglietta | G10L 15/26 704/270.1 |
| 8,688,306 | B1* | 4/2014 | Nemec | G06T 7/20 455/457 |
| 8,989,917 | B2* | 3/2015 | Kumar | B61L 3/006 701/19 |
| 9,494,439 | B1 | 11/2016 | Ross et al. | |
| 9,552,564 | B1* | 1/2017 | Martenis | G07C 9/00571 |
| 10,901,415 | B1* | 1/2021 | Herbach | G06Q 10/02 |
| 10,956,855 | B1* | 3/2021 | Coughran | G06Q 10/047 |
| 2009/0187291 | A1* | 7/2009 | Daum | B61L 3/006 701/19 |
| 2016/0305787 | A1 | 10/2016 | Sato et al. | |
| 2017/0132934 | A1* | 5/2017 | Kentley | G08G 1/202 |
| 2017/0193627 | A1* | 7/2017 | Urmson | G01C 21/3617 |
| 2017/0300049 | A1* | 10/2017 | Seally | G08G 1/202 |
| 2018/0204158 | A1* | 7/2018 | Ratti | G06Q 10/06315 |
| 2018/0275661 | A1* | 9/2018 | Glaser | G01C 21/3423 |
| 2018/0308064 | A1* | 10/2018 | Glaser | G01C 21/3484 |
| 2018/0315146 | A1* | 11/2018 | Matthiesen | G01C 21/3453 |
| 2018/0321050 | A1* | 11/2018 | Chase | G06Q 10/02 |
| 2018/0322775 | A1* | 11/2018 | Chase | G06N 5/022 |
| 2018/0329428 | A1 | 11/2018 | Nagy et al. | |
| 2018/0366004 | A1* | 12/2018 | Laetz | G06Q 10/02 |
| 2019/0064846 | A1* | 2/2019 | Sankavaram | G07C 5/0808 |
| 2019/0079521 | A1* | 3/2019 | Blum | G05D 1/0088 |
| 2019/0186936 | A1 | 6/2019 | Ebner et al. | |
| 2019/0241192 | A1* | 8/2019 | Matthews | B60W 50/0097 |
| 2020/0057438 | A1* | 2/2020 | Engle | G05D 1/0088 |
| 2020/0126417 | A1* | 4/2020 | Selvam | G06Q 50/30 |
| 2020/0160705 | A1* | 5/2020 | Chase | G06Q 50/30 |
| 2020/0166361 | A1 | 5/2020 | Voznesensky et al. | |
| 2020/0201355 | A1* | 6/2020 | Colijn | G06Q 10/00 |
| 2020/0292333 | A1* | 9/2020 | Colijn | G01C 21/34 |
| 2021/0043089 | A1* | 2/2021 | Herbach | G05D 1/0297 |
| 2021/0140777 | A1* | 5/2021 | Balva | G01C 21/3484 |
| 2021/0163040 | A1* | 6/2021 | Kojo | G05D 1/0212 |
| 2021/0200217 | A1* | 7/2021 | Nix | H04W 12/06 |
| 2021/0217125 | A1* | 7/2021 | Engle | G01C 21/3438 |
| 2021/0248555 | A1* | 8/2021 | Berdinis | G06Q 10/08355 |

OTHER PUBLICATIONS

"International Application Serial No. PCT US2019 063654, Written Opinion dated Feb. 4, 2020", 8 pgs.

"International Application U.S. Appl. No. PCT US2019 063654, International Preliminary Report on Patentability dated Jun. 10, 2021", 8 pgs.

"International Application Serial No. PCT US2019 063286, International Search Report dated Mar. 5, 2020", 4 pgs.

"International Application Serial No. PCT US2019 063286, Written Opinion dated Mar. 5, 2020", 7 pgs.

"International Application Serial No. PCT US2019 063286, International Preliminary Report on Patentability dated Jun. 10, 2021", 9 pgs.

"U.S. Appl. No. 16/696,227, Non Final Office Action dated Oct. 1, 2021", 13 pgs.

"U.S. Appl. No. 16/696,227, Response filed Jan. 3, 2022 to Non Final Office Action dated Oct. 1, 2021", 13 pgs.

"European Application Serial No. 19831952.7, Response to Communication persuant to Rules 161 and 162 filed Jan. 17, 2022", 21 pgs.

"U.S. Appl. No. 16/696,227, Final Office Action dated Apr. 12, 2022", 14 pgs.

"U.S. Appl. No. 16/696,227, Response filed Jul. 12, 2022 to Final Office Action dated Apr. 12, 2022", 12 pgs.

"U.S. Appl. No. 16/696,227, Examiner Interview Summary dated Jul. 15, 2022", 2 pgs.

"U.S. Appl. No. 16/696,227, Non Final Office Action dated Aug. 31, 2022", 15 pgs.

"U.S. Appl. No. 16/696,227, Response filed Nov. 29, 2022 to Non Final Office Action dated Aug. 31, 2022", 19 pgs.

"U.S. Appl. No. 16/696,227, Notice of Allowance dated Dec. 19, 2022", 11 pgs.

"U.S. Appl. No. 16/696,227, Notice of Allowance dated Mar. 15, 2023", 11 pgs.

\* cited by examiner

TUNING AUTONOMOUS VEHICLE DISPATCH USING VEHICLE PERFORMANCE

CLAIM FOR PRIORITY

This application claims the benefit of priority of U.S. Application Ser. No. 62/772,420, filed Nov. 28, 2018, which is hereby incorporated by reference in its entirety.

FIELD

This document pertains generally, but not by way of limitation, to devices, systems, and methods for operating and/or managing an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
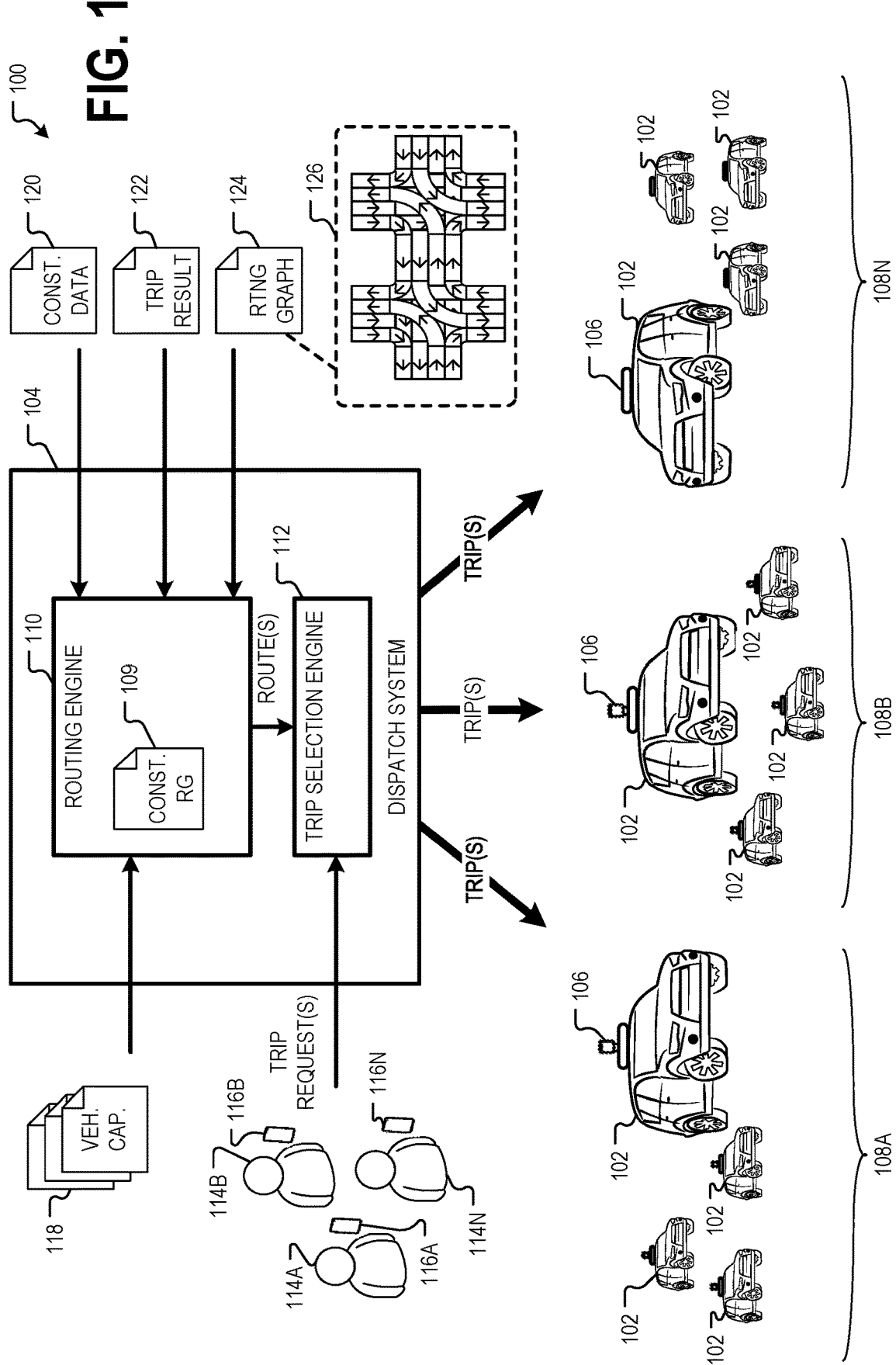
FIG. 1 is a diagram showing one example of an environment for tuning a dispatch system based on the performance of autonomous vehicles.

Examples described herein are directed to systems and methods for dispatching trips to autonomous vehicles. A dispatch system is configured to receive requests for trips. The dispatch system matches requested trips with autonomous vehicles that execute the trips. For example, the dispatch system selects the autonomous vehicle that is best suited to execute a particular trip and then requests that the selected autonomous vehicle execute the trip.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle executes a trip by traversing from a trip start point to a trip end point. For some trips, the vehicle picks up a passenger or cargo at the trip start point and drops off the passenger or cargo at the trip end point. Examples of cargo can include, food, material goods, and the like. Also, some trips include waypoints. Waypoints are positions where the autonomous vehicle passes and/or stops between the trip start point and the trip end point. A vehicle stops at one or more waypoints to pick up or drop off passengers and/or cargo or can pass through a waypoint without stopping.

The dispatch system selects an autonomous vehicle for a trip, at least in part, by generating routes for multiple autonomous vehicles that are candidates to execute the trip. A route is a path that an autonomous vehicle takes, or plans to take, over one or more roadways. The dispatch system uses the generated routes to select the candidate autonomous vehicle that is best suited to execute the trip. For example, the generated routes can indicate when different autonomous vehicles can arrive at the trip start point to begin the trip, how the autonomous vehicles will travel between the trip start point and trip end point, how long it will take the autonomous vehicles to complete the trip, etc. In some examples, the autonomous vehicle best suited to a trip is the autonomous vehicle that can complete the trip at the lowest total cost, where cost is determined based on travel time, risk of adverse events, and/or other factors as described herein.

In some examples, the dispatch system dispatches trips to autonomous vehicles of different types having different capabilities. For example, one type of autonomous vehicle may be capable of executing unprotected left turns while another type may have limited capabilities in that regard. Also, for example, one type of autonomous vehicle may have a maximum speed of 45 miles per hour (mph) while another may have a higher maximum speed. When the dispatch system generates a route for an autonomous vehicle to execute a trip, the route (including the cost to execute the route) can reflect the capabilities of the autonomous vehicle. In this way, the dispatch system can consider the different capabilities of autonomous vehicles of different types when selecting an autonomous vehicle to execute a trip.

In some examples, the dispatch system learns about the capabilities of different types of autonomous vehicles using vehicle capability data provided by the manufacturer or other party associated with a type of autonomous vehicle. In some examples, the vehicle capability data is referred to as operational domain (OD) or operational design domain (ODD) data. The vehicle capability data describes properties of route components that the vehicle is not capable of traversing and/or other constraints on vehicle operation.

In some examples, however, vehicle capability data can be incomplete or incorrect. For example, some vehicle types may not have associated vehicle capability data. Also, in some examples, vehicle capability data provided by a vehicle manufacturer or other associated party may not be completely correct. For example, a first type of autonomous vehicle may have vehicle capability data indicating that it can handle unprotected left turns with oncoming traffic traveling at 35 mph or less. In practice, however, vehicles of the first type may require intervention at an unacceptably high percentage of unprotected left turns, even when oncoming traffic is traveling at 35 mph or less.

Various examples described herein address these and other issues by utilizing a dispatch system that is programmed to determine and apply routing constraints to vehicles of a particular vehicle type. A routing constraint changes the connectivity and/or the cost of route components in a routing graph used to generate routes. The dispatch system receives trip result data describing a plurality of trips executed by autonomous vehicles of a first type. The dispatch system uses the trip result data to determine one or more routing constraints for autonomous vehicles of the first type. For subsequent trips, the dispatch system applies the determined routing constraints when generating routes for vehicles of the first type. As described herein, the generated routes are used to select vehicles to execute trips.

FIG. 1 is a diagram showing one example of an environment 100 for tuning a dispatch system 104 based on the performance of autonomous vehicles. The environment 100 includes the dispatch system 104 and vehicles 102 of different types. The vehicles 102 can be passenger vehicles, such as trucks, cars, buses, or other similar vehicles. The vehicles 102 can also include delivery vehicles, such as vans, trucks, tractor trailers, etc. The vehicles 102 are self-driving vehicles (SDVs) or autonomous vehicles (AVs). For example, each vehicle 102 includes a vehicle autonomy system, described in more detail with respect to FIG. 2, that is configured to operate some or all of the controls of the vehicle 102 (e.g., acceleration, braking, steering).

In some examples, one or more of the vehicles 102 are operable in different modes, where the vehicle autonomy system has differing levels of control over the vehicle 102 in different modes. Some vehicles 102 may be operable in a fully autonomous mode in which the vehicle autonomy system has responsibility for all or most of the controls of the vehicle 102. Some vehicles 102 may be operable in a semiautonomous mode that is in addition to or instead of the fully autonomous mode. In a semiautonomous mode, the vehicle autonomy system of a vehicle 102 is responsible for some of the vehicle controls while a human user or driver is responsible for other vehicle controls. In some examples, one or more of the vehicles 102 are operable in a manual mode in which the human user is responsible for all control of the vehicle 102. Additional details of an example vehicle autonomy system are provided herein with reference to FIG. 2.

The vehicles 102 include one or more remote-detection sensor sets 106. (Each vehicle 102 may have a respective remote-detection sensor set although, for clarity, not all of the remote-detection sensor sets 106 are individually labeled.) The remote-detection sensor sets 106 include one or more remote-detection sensors that receive return signals from the environment 100. Return signals may be reflected from objects in the environment 100, such as the ground, buildings, trees, etc. The remote-detection sensor sets 106 may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the return signals. In some examples, the remote-detection sensor sets 106 include one or more passive sensors that receive return signals that originated from other sources of sound or electromagnetic radiation. The remote-detection sensor sets 106 provide remote-detection sensor data that describes the environment 100. The vehicles 102 can also include other types of sensors, for example, as described in more detail with respect to FIG. 2.

The environment 100 shows vehicles 102 of three different vehicle types 108A, 108B, 108N. Although three different vehicle types 108A, 108B, 108N are shown in FIG. 1, the dispatch system 104 can be configured to dispatch trips to more or fewer different vehicle types.

In some examples, the different types 108A, 108B, 108N of vehicles 102 have different capabilities. For example, the different types 108A, 108B, 108N of vehicles 102 can have different vehicle autonomy systems. This can include, for example, vehicle autonomy systems created by different manufacturers or designers, vehicle autonomy systems having different software versions or revisions, etc. Also, in some examples, the different types 108A, 108B, 108N of vehicles 102 can have different remote-detection sensor sets 106. For example, one type 108A of vehicles 102 may include a LIDAR remote-detection sensor, while another type 108N of vehicle 102 may include stereoscopic cameras and omit a LIDAR remote-detection sensor. In some examples, different types 108A, 108B, 108N of vehicles 102 can also have different mechanical particulars. For example, one type 108A of vehicle may have all-wheel drive, while another type 108B may have front-wheel drive.

The dispatch system 104 is programmed to assign trips to the vehicles 102 as described herein. The dispatch system 104 can be or include one or more servers or other suitable computing devices. The dispatch system 104 is configured to receive trip requests from one or more users 114A, 114B, 114N. The users 114A, 114B, 114N can make trip requests with user computing devices 116A, 116B, 116N. The user computing devices 116A, 116B, 116N can be or include any suitable computing device such as, for example, tablet computers, mobile telephone devices, laptop computers, desktop computers, etc. In some examples, the user computing devices 116A, 116B, 116N execute an application associated with a transportation service implemented with the dispatch system 104. The users 114A, 114B, 114N launch the application on the respective user computing devices 116A, 116B, 116N and utilize functionality of the application to make trip requests.

The dispatch system 104 comprises a trip selection engine 112 that is programmed to receive and process trip requests and a routing engine 110 that generates routes for candidate autonomous vehicles 102 to execute a requested trip. When the trip selection engine 112 receives a trip request, it identifies a set of candidate autonomous vehicles 102 for executing the trip. The set of candidate autonomous vehicles 102 can include autonomous vehicles 102 that are best suited for executing the trip. For example, the set of candidate autonomous vehicles 102 can include autonomous vehicles 102 that are near to a trip start point. In some examples, the candidate autonomous vehicles 102 are limited to vehicles capable of executing the trip. For example, a trip that involves moving a large cargo object may be executable only by autonomous vehicles 102 having sufficient space to carry the large object. A trip that involves moving, for example, five passengers may be executable only by autonomous vehicles 102 having sufficient space to carry five passengers.

The trip selection engine 112 provides an indication of the candidate autonomous vehicles 102 to the routing engine 110. The routing engine 110 generates candidate routes for some or all of the set of candidate autonomous vehicles 102. The candidate routes are described by respective route costs. The trip selection engine 112 uses the candidate routes to select the autonomous vehicle 102 best suited to execute the trip. For example, the candidate autonomous vehicle 102 best suited to execute the trip may be the candidate autonomous vehicle 102 having the lowest-cost route for the trip.

In some examples, the trip selection engine 112 uses type metrics associated with particular types 108A, 108B, 108N of autonomous vehicles 102 in addition to or instead of the candidate routes to select an autonomous vehicle 102 for executing a trip. The trip selection engine 112 can weight the cost of the candidate routes based on type metrics associated with the candidate autonomous vehicles 102. Non-limiting examples of type metrics are described below:

Estimated Time of Arrival (ETA):

ETA describes the time between when a trip is requested and when an autonomous vehicle 102 arrives at the trip start point (e.g., to pick up a passenger or cargo). Different types 108A, 108B, 108N of autonomous vehicles 102 may consistently exhibit higher or lower ETAs. For example, some types 108A, 108B, 108N of autonomous vehicles 102 respond slower or faster to a trip request from the dispatch system 104. The trip selection engine 112 may weight candidate route costs to favor types 108A, 108B, 108N with lower average ETAs, for example, as indicated by trip result data 122.

Estimated Time of Dropoff (ETD):

ETD can describe the average time between when a trip is requested and when the autonomous vehicle 102 completes the trip by arriving at the trip end point (e.g., to drop off a passenger or cargo). The trip selection engine 112 may weight candidate route costs to favor types 108A, 108B, 108N with lower average ETDs, for example, as indicated by the trip result data 122.

Price:

Different types 108A, 108B, 108N of autonomous vehicles 102 can be associated with providers who charge different rates for trips. In some examples, the trip selection engine 112 may weight candidate route costs to favor types 108A, 108B, 108N that have a lower cost.

Average Customer Rating:

Customer ratings can be used to generate routing graph constraints, as described herein. In some examples, though, the trip selection engine 112 uses an average customer rating for a type 108A, 108B, 108N of autonomous vehicle 102 in addition to candidate routes to select an autonomous vehicle 102 for executing a route. The trip selection engine 112 may weight candidate route costs to favor types 108A, 108B, 108N having higher average customer ratings.

Availability:

Different types 108A, 108B, 108N of autonomous vehicles 102 can have different availability for receiving trips. Availability can be expressed, for example, as a time that an autonomous vehicle 102 is available for accepting trips over a given period (e.g., hours per week, hours per month, etc.). For example, some types 108A, 108B, 108N of autonomous vehicles 102 may suffer mechanical down time more often than others. The trip selection engine 112 may weight candidate route costs to favor types 108A, 108B, 108N that have a higher availability.

Utilization:

Utilization describes the time that an autonomous vehicle 102 is executing a trip over the total time that the autonomous vehicle 102 is available to accept trips. The trip selection engine 112 may weight candidate route costs to favor types 108A, 108B, 108N with a higher utilization.

Acceptance Rate:

Acceptance rate describes the portion of trips offered to an autonomous vehicle 102 that are accepted by the autonomous vehicle 102. The trip selection engine 112 may weight candidate route costs to favor types 108A, 108B, 108N with higher acceptance rates.

Cost/Mile:

Cost per mile reflects the cost per mile (or per other unit distance) of operating an autonomous vehicle 102. This can be affected, for example, by fuel mileage, maintenance costs, landscape and terrain, etc. The trip selection engine 112 may weight candidate route costs to favor types 108A, 108B, 108N having lower costs per mile. Also, in some examples, cost per mile can be described both for times when an autonomous vehicle 102 is on a trip and for times when an autonomous vehicle 102 is off a trip.

Vehicle Capability Data:

In some examples, the trip selection engine 112 weights candidate route costs to favor types 108A, 108B, 108N for which the dispatch system 104 has more complete vehicle capability data. As described herein, vehicle capability data can be received from a manufacturer of a type 108A, 108B, 108N of autonomous vehicle 102 as OD or ODD data and/or derived, as described herein, from the trip result data 122. The trip selection engine 112 may favor types 108A, 108B, 108N for which it has more vehicle capability data, for example, because those types may be more predictable.

In some examples, the dispatch system 104 is configured to consider selecting non-autonomous vehicles to execute trips. If a non-autonomous vehicle is selected as a candidate vehicle, the routing engine 110 generates a candidate route for that vehicle, for example, as described herein. In some examples, the trip selection engine 112 considers additional type metrics related to non-autonomous vehicles, such as, for example, a retention rate describing the number of human drivers who are active in a given time period (e.g., month or year). For example, the trip selection engine 112 may weight candidate route costs to maximize the number of human drivers who are active in a given time period. Another example type metric related to non-autonomous vehicles is driver earnings (e.g., hourly earnings). For example, the trip selection engine 112 may weight candidate route costs to maximize the hourly earnings of human drivers.

It will be appreciated that the type metrics described herein are examples. Additional type metrics and/or modifications of the type metrics described herein may be used. Also, in some examples, the trip selection engine 112 can consider other type metrics not specifically described.

When the trip selection engine 112 selects an autonomous vehicle 102 (or non-autonomous vehicle) for a trip, the trip selection engine 112 sends a trip execution request to the selected autonomous vehicle 102. The selected autonomous vehicle 102 can accept or decline the trip. If the selected autonomous vehicle 102 accepts the trip, the vehicle autonomy system of that autonomous vehicle 102 begins to control the vehicle towards the trip start point to execute the trip. If the selected autonomous vehicle 102 declines the trip, the trip selection engine 112 can select a next candidate autonomous vehicle 102 to execute the trip, for example, by selecting the candidate autonomous vehicle 102 with the next-lowest-cost route for executing the trip.

The routing engine 110 generates routes utilizing, for example, a routing graph 124 in conjunction with constraint data 120 such as, for example, policy data, vehicle capability data, and/or operational constraint data. The routing graph 124 is a representation of the roadways in a geographic area. The routing graph 124 can represent the roadways as a set of route components, which are sometimes also referred to as lane segments. In some examples, the routing graph 124 indicates directionality, connectivity, and cost for the various route components making up the roadways. Directionality indicates the direction of travel in a route component. Connectivity describes route component connections indicating possible transitions between route components. Cost describes the cost for an autonomous vehicle 102 to traverse a route component.

In FIG. 1, a break-out window 126 shows example route components making up part of the routing graph 124. Route components in the break-out window 126 are illustrated as shapes with arrows indicating the directionality of the route components. Route components can be connected to one another according to their directionality.

The routing engine 110 is configured to utilize vehicle capability data 118 and/or other constraint data 120 to generate constrained routing graph 109 data. The vehicle capability data 118 and other constraint data 120 indicate constraints that are applied to the routing graph 124 to generate the constrained routing graph 109. Generally, a constraint includes a constraint property or set of constraint properties describing route components subject to the constraint and one or more routing graph modifications for implementing the constraint. Routing graph modifications can include, for example, removing route components having the indicated property or properties from the routing graph, and removing route component connections to route components having the indicated property or properties from the routing graph. Another example routing graph modification can include changing a cost associated with a route component (e.g., a route component cost) and/or transitions to the route component.

Costs may be changed up or down. For example, if the constraint data 120 indicates that route components having a particular constraint property or set of constraint properties are disfavored, the costs to traverse and/or transition to the route components can be increased. On the other hand, if the constraint data 120 indicates that route components having a particular constraint property or set of constraint properties are favored, the costs to traverse and/or transition to the route components can be decreased.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 124 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs, but can lead only to other route components that include cul-de-sacs.

The vehicle capability data 118 describes constraints associated with various autonomous vehicles 102 of different types 108A, 108B, 108N. For example, the vehicle capability data 118 can be and/or be derived from OD or ODD data, if any, provided by the vehicle's manufacturer.

As described herein, the vehicle capability data 118 can be supplemented using the trip result data 122 to cause the vehicle capability data 118 to more closely match the actual performance of autonomous vehicles 102 of the various types 108A, 108B, 108N. Constraints described by the vehicle capability data 118 can include constraint data identifying a route component property or properties (e.g., includes an unprotected left, is part of a controlled access highway, etc.) and routing graph modification data indicating what is to be done to route components having the indicated property or properties. For example, route components that a particular vehicle type 108A, 108B, 108N is not capable of traversing can be removed from the routing graph or can have connectivity data modified to remove transitions to those route components. For example, the dispatch system 104 can remove one or more connections to the route component. If the route component properties indicate a maneuver that is undesirable for a vehicle, but not forbidden, then the routing graph modification data can call for increasing the cost of an identified route component or transitions thereto.

Other constraint data 120 can describe other constraints utilized to generate the constrained routing graph 109. For example, the other constraint data 120 can include policy constraints. Policy constraints include route component properties that identify route components subject to a policy constraint and corresponding routing graph modifications. Policy constraints refer to types of route components that it is desirable for a vehicle to avoid or prioritize. An example policy constraint is to avoid route components that are in or pass through school zones. Another example policy constraint is to avoid routing vehicles through residential neighborhoods. Yet another example policy constraint is to favor routing vehicles on controlled-access highways, if available. Policy constraints can apply to some vehicles, some vehicle types, all vehicles, or all vehicle types.

In some examples, the other constraint data 120 also describes operational constraints. An operational constraint can include a set of route component properties and associated routing graph modifications. Operational constraints can be based, for example, on the state of one or more roadways. For example, if a roadway is to be closed for a parade or for construction, an operational constraint identifies properties (e.g., names or locations) of route components that are part of the closure and an associated routing graph modification (e.g., removing the route components, removing transitions to the route components, etc.).

The routing engine 110 applies the constraint data 120 to generate the constrained routing graph 109. The constrained routing graph 109 is used to generate a route for an autonomous vehicle 102. (In some examples, different constrained routing graphs 109 are generated for different types 108A, 108B, 108N of autonomous vehicles 102.) The routing engine 110 determines a route for the autonomous vehicle 102, for example, by applying a path-planning algorithm to the constrained routing graph 109 to find the lowest-cost route for the vehicle. Any suitable path-planning algorithm can be used, such as, for example, A*, D*, Focused D*, D* Lite, GD*, or Dijkstra's algorithm. A generated route can include a string of connected route components between a vehicle start point and a vehicle end point. A vehicle start point is an initial route component of a route. A vehicle end point is a last route component of a route. In some examples, the vehicle start point is a current location of the relevant autonomous vehicle 102, and the vehicle end point is the end point for the requested trip. For example, on the route, the autonomous vehicle 102 can travel from its current location to the trip start point, and then proceed to the trip end point traversing trip waypoints (if any) along the way.

The routing engine 110, in some examples, generates the constrained routing graph 109 at different times during route generation. In some examples, the routing engine 110 receives a request to generate a route for a particular autonomous vehicle 102. The routing engine 110 responds by accessing the current constraints for the autonomous vehicle 102 (e.g., vehicle capability data 118 and other constraint data 120). The routing engine 110 applies the constraints to the routing graph 124 to generate the constrained routing graph 109 and then uses the constrained routing graph 109 to generate a route.

In another example, the routing engine 110 generates the constrained routing graph 109 on an as-needed basis. For example, various path-planning algorithms described herein operate using graph expansion. To apply a graph expansion-type algorithm, the routing engine 110 begins at an algorithm start point and expands along allowable transitions to string together connected route components. The algorithm is complete when one or more of the strings of connected route components has an allowable transition to or from an algorithm end point. Many graph-expansion algorithms can be applied forwards (e.g., from a vehicle start point to a vehicle end point) or backwards (e.g., from a vehicle end point to a vehicle start point).

To generate the constrained routing graph 109 on an as-needed basis, the routing engine 110 can request a subset of the constrained routing graph 109 while graph expansion is being performed. For example, the routing engine 110 can determine a first portion of a route including a string of connected route components. The routing engine 110 can then request constrained routing graph 109 data describing a set of route components that can be transitioned to the last route component of the string (or a set of route components from which a vehicle can transition to the last route component of the string if the algorithm is applied backwards). In this way, the routing engine 110 may not need to apply the constraint data to all route components of the routing graph 124 but, instead, only to the route components used by the path-planning algorithm.

The dispatch system 104 (e.g., the routing engine 110) is, in some examples, configured to generate new vehicle capability constraints for autonomous vehicles 102 of different types 108A, 108B, 108N based on the trip result data 122.

The trip result data 122 describes the results of trips executed by autonomous vehicles 102 of different types 108A, 108B, 108N. The trip result data 122 can include various information about a trip, including, for example, an actual route traversed by the autonomous vehicle 102 to execute the trip and various events that occurred on the trip.

Various different types of events can occur on a trip and be described by the trip result data 122. One example event that can occur on a trip is an intervention. An intervention occurs when the vehicle autonomy system of an autonomous vehicle 102 ceases to control the vehicle 102. This can occur, for example, if the vehicle autonomy system crashes, if the autonomous vehicle 102 encounters a road condition through which the vehicle autonomy system cannot direct the vehicle, if the autonomous vehicle 102 encounters a route component that the vehicle 102 cannot traverse, etc. In some examples, the autonomous vehicle 102 carries a human user who can assume control upon the occurrence of an intervention. Also, in some examples, the autonomous vehicle 102 is configured to pull over to a safe stopping location upon the occurrence of an intervention.

Another example event that can occur on a trip is receiving a customer rating below a customer rating threshold. In some examples, the users 114A, 114B, 114N can provide a customer rating for a trip, e.g., after the trip is executed. A customer rating indicates a user's level of satisfaction with a trip.

Yet another example of an event that can occur on a trip is a deviation from a planned route. For example, when the dispatch system 104 requests that an autonomous vehicle 102 execute a route, it may provide the route for the selected autonomous vehicle 102 generated by the routing engine 110. The autonomous vehicle 102, for various reasons, may deviate from this route. For example, the autonomous vehicle 102 can include and/or be in communication with another routing engine and/or other component that can route the vehicle 102. The autonomous vehicle 102 can disregard the received route generated by the routing engine 110 and/or deviate from the received route.

Another example event that can occur on a trip is an autonomous vehicle 102 declining a trip. An autonomous vehicle 102 can decline a trip for various reasons including, for example, if the autonomous vehicle 102 determines that the trip will cause the autonomous vehicle 102 to traverse a route component that is impassable or otherwise unfavorable to the autonomous vehicle 102.

A further example of an event that can occur on a trip is a deviation from an estimated time of arrival. For example, the routes generated by the routing engine 110 can include an estimated time of arrival for the various autonomous vehicles 102, where the estimated time of arrival indicates when the autonomous vehicle 102 is estimated to complete the trip.

The dispatch system 104 (e.g., the routing engine 110) can be configured to generate additional routing constraints for autonomous vehicles 102 of different types 108A, 108B, 108N using the trip result data 122. The dispatch system 104 can process a vehicle trip by determining whether any events occurred during the trip (e.g., an intervention, a deviation from the generated route, a deviation from an estimated time of arrival, a customer rating less than a threshold, etc.). In some examples, the dispatch system 104 is programmed to identify events from a predetermined set of event types.

If one or more events occurred during a trip, the dispatch system 104 attempts to associate the one or more events with one or more route components. This can be done in various different ways. In some examples, an event is localized. For example, an intervention occurs at a particular location. One or more route components associated with an intervention can include a route component at which the intervention took place, one or more route components that the vehicle traversed before the intervention took place, etc. Another example of an event that is localized can be a deviation from the route determined by the routing engine 110. Tracing the motion of an autonomous vehicle 102 may make it possible to identify, for example, the last route component or components that the vehicle traversed before leaving the route, the next route component or components that the vehicle would have traversed had it not deviated from the route, etc.

In some examples, the trip result data 122 includes metadata describing where an event took place. For example, a customer rating may include comments or other data that indicate the reasons that the user provided a particular rating. The comment can indicate a particular route component or route component type. For example, a user may provide a customer rating lower than a threshold level and accompany the customer rating with a comment indicating that the vehicle was uncomfortably fast in tight corners. In this example, the dispatch system 104 can identify one or more route components with corners tighter than a threshold level and associate these one or more route components with the event.

In examples where an event is not localized or does not include metadata describing where the event took place, the dispatch system 104 can cross-reference the trip to records of other trips executed by autonomous vehicles 102 of the same type 108A, 108B, 108N. For example, the dispatch system 104 can look at all trips for which vehicles 102 of one type 108A, 108B, 108N received lower than a threshold customer rating and identify commonalities. For example, if 40% of the trips taken by autonomous vehicles 102 of the type 108A with a customer rating less than the threshold include an unprotected left, then the dispatch system 104 can associate route components including an unprotected left with the event.

Upon identifying one or more route components associated with an event, the dispatch system 104 determines if a route component or route component property is associated with an event or event type at greater than a threshold level. If so, the dispatch system 104 generates a routing constraint for the relevant type 108A, 108B, 108N of autonomous vehicle 102. Routing constraints can be for a particular route component or for route components having a particular property. For example, if a first route component has been associated with interventions for autonomous vehicles 102 of the type 108B at more than a threshold rate, then the dispatch system 104 can generate a routing constraint that increases the cost of the first route component and/or modifies connectivity to remove the first route component from the constrained routing graph 109 for autonomous vehicles 102 of the type 108B. Similarly, if the trip result data 122 indicates that route components having a first property (e.g., an unprotected left) are associated with interventions for autonomous vehicles 102 of the type 108B at more than a threshold rate, then the dispatch system 104 can generate a routing constraint that increases the cost of route components having the first property and/or a connectivity modification that removes those route components from the constrained routing graph 109 for autonomous vehicles 102 of the type 108B.

Routing constraints generated using the trip result data 122 can be positive or negative. For example, some events indicate that an autonomous vehicle 102 is executing trips better than would be expected from the associated vehicle capability data 118. For example, if autonomous vehicles 102 of the type 108N are deviating from provided routes and arriving earlier than expected on more than a threshold portion of trips that include a particular route component or route components having a particular property, the dispatch system 104 can lower the cost of the relevant route component or components.

Figure 2:
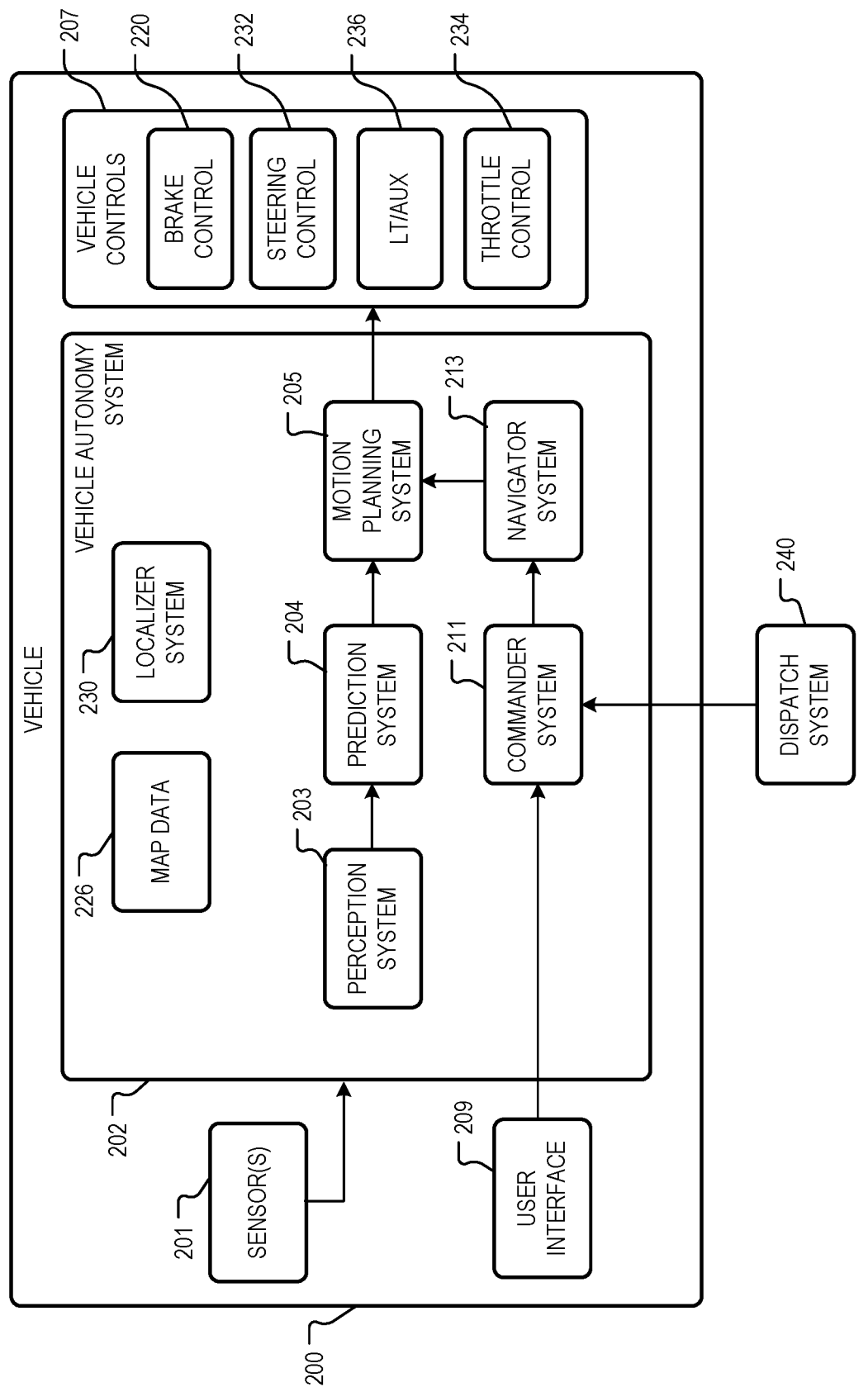
FIG. 2 depicts a block diagram of an example vehicle according to example aspects of the present disclosure.

FIG. 2 depicts a block diagram of an example vehicle 200 according to example aspects of the present disclosure. The vehicle 200 includes one or more sensors 201, a vehicle autonomy system 202, and one or more vehicle controls 207. The vehicle 200 is an autonomous vehicle, as described herein. The example vehicle 200 shows just one example arrangement of an autonomous vehicle. In some examples, autonomous vehicles of different types can have different arrangements.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, etc.

The sensors 201 may also include one or more remote-detection sensors or sensor systems, such as a LIDAR system, a RADAR system, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at various different locations on the vehicle 200. As an example, in some implementations, one or more cameras and/or LIDAR sensors can be located in a pod or other structure that is mounted on a roof of the vehicle 200, while one or more RADAR sensors can be located in or behind the front and/or rear bumper(s) or body panel(s) of the vehicle 200. As another example, one or more cameras can be located at the front or rear bumper(s) of the vehicle 200. Other locations can be used as well.

The localizer system 230 receives some or all of the sensor data from the sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a dispatch system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the dispatch system 240. The dispatch system 240 is programmed to provide instructions to multiple vehicles, for example, as part of a fleet of vehicles for moving passengers and/or cargo. Data from the dispatch system 240 can be provided via a wireless network, for example.

The navigator system 213 receives one or more target locations from the commander system 211 and map data 226. The map data 226, for example, provides detailed information about the surrounding environment of the vehicle 200. The map data 226 provides information regarding identity and location of different roadways and segments of roadways (e.g., lane segments or route components). A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle 200 to take to arrive at the one or more target locations. In some implementations, the navigator system 213 determines route data using one or more path-planning algorithms based on costs for route components, as described herein. For example, a cost for a route can indicate a time of travel, risk of danger, or other factor associated with adhering to a particular candidate route. Route data describing a route is provided to the motion planning system 205, which commands the vehicle controls 207 to implement the route or route extension, as described herein. The navigator system 213 can generate routes as described herein using a general-purpose routing graph and constraint data. Also, in examples where route data is received from the dispatch system 240, that route data can also be provided to the motion planning system 205.

The perception system 203 detects objects in the surrounding environment of the vehicle 200 based on sensor 201 data, the map data 226, and/or vehicle poses provided by the localizer system 230. For example, the map data 226 used by the perception system 203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the perception system 203.

Prediction data for an object is indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle such that the vehicle turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls 207 based at least in part on the predicted trajectories associated with the objects within the surrounding environment of the vehicle 200, the state data for the objects provided by the perception system 203, vehicle poses provided by the localizer system 230, the map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from the one or more sensors 201. For example, as new sensor data is obtained from the one or more sensors 201, the sensor data can be analyzed by the perception system 203, the prediction system 204, and the motion planning system 205 to determine the motion plan.

The motion planning system 205 can provide control commands to the one or more vehicle controls 207. For example, the one or more vehicle controls 207 can include throttle systems, brake systems, steering systems, and other control systems, each of which can include various vehicle controls (e.g., actuators or other devices that control gas flow, steering, and braking) to control the motion of the vehicle 200. The various vehicle controls 207 can include one or more controllers, control devices, motors, and/or processors.

The vehicle controls 207 include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlights, parking lights, running lights, etc.

Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component, to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise be a part of the vehicle autonomy system 202 configured to control the vehicle 200 based at least in part on data obtained from the one or more sensors 201. For example, data obtained by the one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205, and/or the localizer system 230. Descriptions of hardware and software configurations for computing devices to implement the vehicle autonomy system 202 and/or the dispatch system 104 of FIG. 1. are provided herein with reference to FIGS. 6 and 7.

Figure 3:
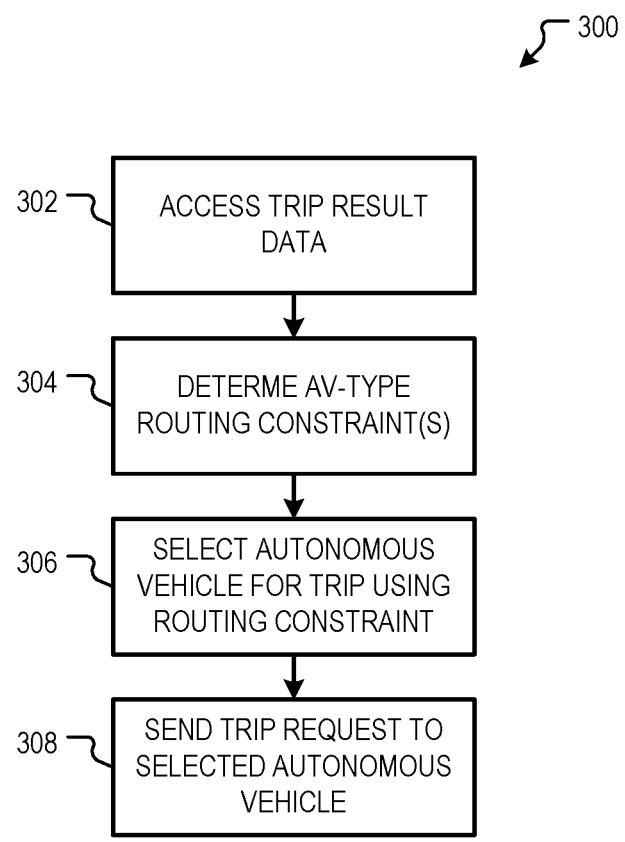
FIG. 3 is a flowchart showing one example of a process flow that can be executed by the dispatch system of FIG. 1 to tune trip dispatching based on trip result data.

FIG. 3 is a flowchart showing one example of a process flow 300 that can be executed by the dispatch system 104 to tune trip dispatching based on trip result data. At operation 302, the dispatch system 104 accesses trip result data. The trip result data describes a plurality of trips executed by autonomous vehicles. In some examples, the trip result data describes trips executed by autonomous vehicles of different types. In other examples, the trip result data describes trips executed by autonomous vehicles of a single type. The trip result data can include various data about the trips such as, for example, indications and/or descriptions of any events that occurred on the trip and metadata describing the events. In some examples, the trip result data also includes other data regarding the trips, such as, for example, a planned route for the trip, an actual route for the trip, localization data describing poses of the vehicle during the trip, etc.

At operation 304, the dispatch system 104 determines at least one routing constraint for a first type of autonomous vehicle. This can be performed, for example, as described herein. The dispatch system 104 can associate events described by the trip result data 122 for the first type of autonomous vehicle with one or more route components from the routing graph 124. Upon identifying one or more route components associated with an event, the dispatch system 104 identifies one or more route component properties that may have contributed to the event. The dispatch system 104 generates one or more constraints that apply a graph modification to route components at the routing graph 124 that have the same route component properties (e.g., unprotected left turn, speed limit about 35 mph, etc.). In some examples where the trip result data 122 describes multiple types of autonomous vehicles, the dispatch system 104 generates routing constraints for multiple different types of autonomous vehicles at operation 304.

At operation 306, the dispatch system 104 selects an autonomous vehicle 102 for a trip using the routing constraint or constraints generated at operation 304. This can include, for example, generating candidate routes including a candidate route for at least one autonomous vehicle of the first type. The candidate route for the autonomous vehicle of the first type may be generated with a constrained routing graph 109 generated by applying the routing constraint or constraints generated at operation 304. The dispatch system 104 can select an autonomous vehicle based on costs of the candidate routes. At operation 308, the dispatch system 104 sends a trip request to the selected autonomous vehicle, which begins to manipulate vehicle controls to execute the route.

Figure 4:
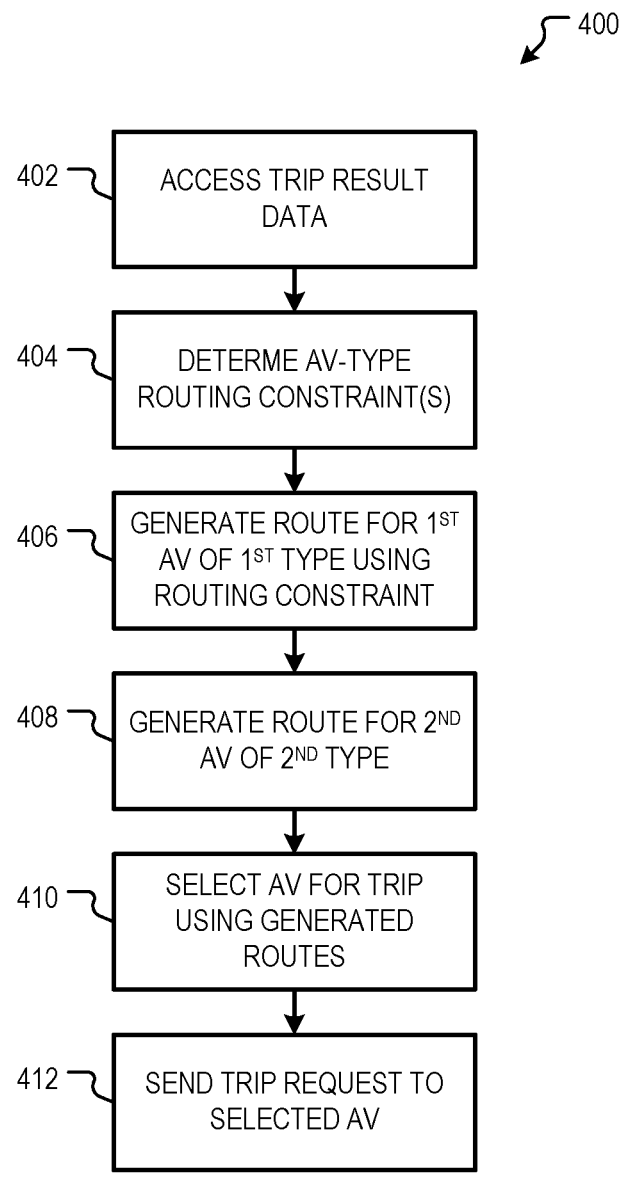
FIG. 4 is a flowchart showing another example of a process flow that can be executed by the dispatch system of FIG. 1 to tune trip dispatching based on trip result data.

FIG. 4 is a flowchart showing another example of a process flow 400 that can be executed by the dispatch system 104 to tune trip dispatching based on trip result data. At operation 402, the dispatch system 104 accesses trip result data. The trip result data describes a plurality of trips executed by autonomous vehicles. In this example, the trip result data describes, at least, trips executed by autonomous vehicles of a first type and trips executed by autonomous vehicles of a second type.

At operation 404, the dispatch system 104 determines at least one routing constraint for the first type of autonomous vehicle and at least one routing constraint for the second type of autonomous vehicle. This can be performed, for example, as described herein. At operation 406, the dispatch system 104 generates a candidate route for an autonomous vehicle of the first type using at least one routing constraint generated at operation 404. The candidate route can execute a first trip. At operation 408, the dispatch system 104 generates a candidate route for an autonomous vehicle of the second type to execute the first trip, also using at least one routing constraint generated at operation 404.

At operation 410, the dispatch system 104 selects the first autonomous vehicle or the second autonomous vehicle to execute the first trip using the candidate routes generated at operations 406, 408. The dispatch system 104 can select the vehicle with the lowest-cost candidate route and/or can consider other factors, as described herein. At operation 412, the dispatch system 104 sends a trip request to the selected autonomous vehicle, which begins to manipulate vehicle controls to execute the route.

Figure 5:
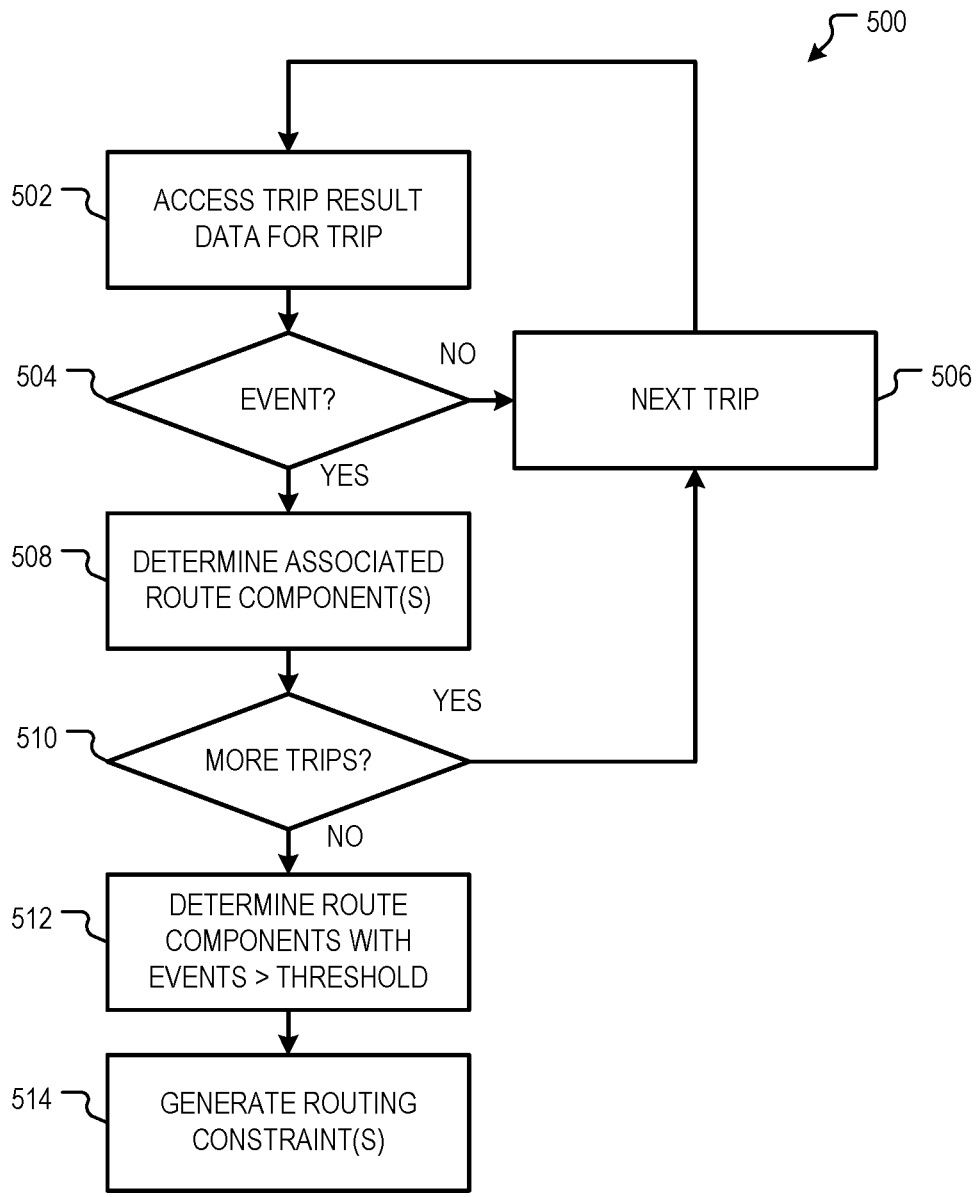
FIG. 5 is a flowchart showing one example of a process flow that can be executed by the dispatch system of FIG. 1 to determine routing constraints for autonomous vehicles of a particular type using trip result data.

FIG. 5 is a flowchart showing one example of a process flow 500 that can be executed by the dispatch system 104 to determine routing constraints for autonomous vehicles of a first type using trip result data. At operation 502, the dispatch system 104 accesses trip result data for a first trip. At operation 504, the dispatch system 104 determines if there are any events associated with the first trip. In some examples, this includes determining whether there are any adverse events associated with the first trip. If there are no events (e.g., no adverse events) associated with the first trip, the dispatch system 104 proceeds to the next trip at operation 506 and accesses trip result data for the next trip at operation 502.

If there is an event associated with the first trip, the dispatch system 104 determines one or more route components associated with the event or events associated with the first trip at operation 508. This can be performed, for example, as described herein. At operation 510, the dispatch system 104 determines if there are more trips to be considered. If yes, the dispatch system 104 increments to the next trip at operation 506 and returns to operation 502. If there are no additional trips, the dispatch system 104, at operation 512, determines route components from the routing graph 124 that have greater than a threshold number or rate of events. At operation 514, the dispatch system 104 generates routing constraints for the first vehicle type, for example, based on the route components identified at operation 512.

Figure 6:
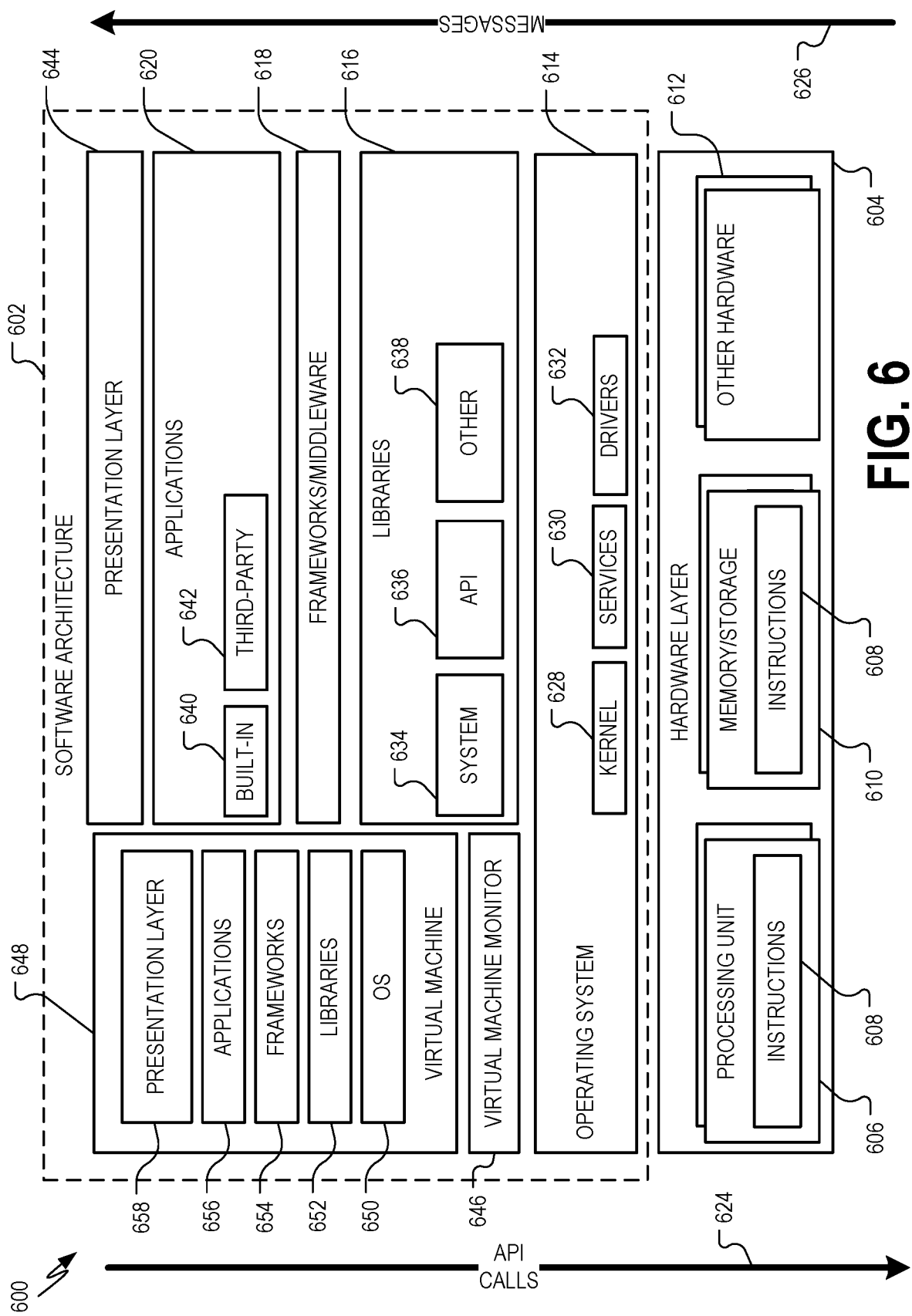
FIG. 6 is a block diagram showing one example of a software architecture for a computing device.

FIG. 6 is a block diagram 600 showing one example of a software architecture 602 for a computing device. The software architecture 602 may be used in conjunction with various hardware architectures, for example, as described herein. FIG. 6 is merely a non-limiting example of a software architecture 602, and many other architectures may be implemented to facilitate the functionality described herein. A representative hardware layer 604 is illustrated and can represent, for example, any of the above-referenced computing devices. In some examples, the hardware layer 604 may be implemented according to an architecture 700 of FIG. 7 and/or the software architecture 602 of FIG. 6.

The representative hardware layer 604 comprises one or more processing units 606 having associated executable instructions 608. The executable instructions 608 represent the executable instructions of the software architecture 602, including implementation of the methods, modules, components, and so forth of FIGS. 1-5. The hardware layer 604 also includes memory and/or storage modules 610, which also have the executable instructions 608. The hardware layer 604 may also comprise other hardware 612, which represents any other hardware of the hardware layer 604, such as the other hardware illustrated as part of the architecture 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and a presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature, and not all software architectures have all layers. For example, some mobile or special-purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of a hardware or software interrupt and, in response, cause the software architecture 602 to pause its current processing and execute an interrupt service routine (ISR) when an interrupt is received. The ISR may generate an alert.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), WiFi® drivers, near-field communication (NFC) drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be used by the applications 620 and/or other software components/modules. For example, the frameworks 618 may provide various graphical user interface (GUI) functions, high-level resource management, high-level location services, and so forth. The frameworks 618 may provide a broad spectrum of other APIs that may be used by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 642 may invoke the API calls 624 provided by the mobile operating system such as the operating system 614 to facilitate functionality described herein.

The applications 620 may use built-in operating system functions (e.g., kernel 628, services 630, and/or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 6, this is illustrated by a virtual machine 648. A virtual machine creates a software environment where applications/modules can execute as if they were executing on a hardware computing device. The virtual machine 648 is hosted by a host operating system (e.g., the operating system 614) and typically, although not always, has a virtual machine monitor 646, which manages the operation of the virtual machine 648 as well as the interface with the host operating system (e.g., the operating system 614). A software architecture executes within the virtual machine 648, such as an operating system 650, libraries 652, frameworks/middleware 654, applications 656, and/or a presentation layer 658. These layers of software architecture executing within the virtual machine 648 can be the same as corresponding layers previously described or may be different.

Figure 7:
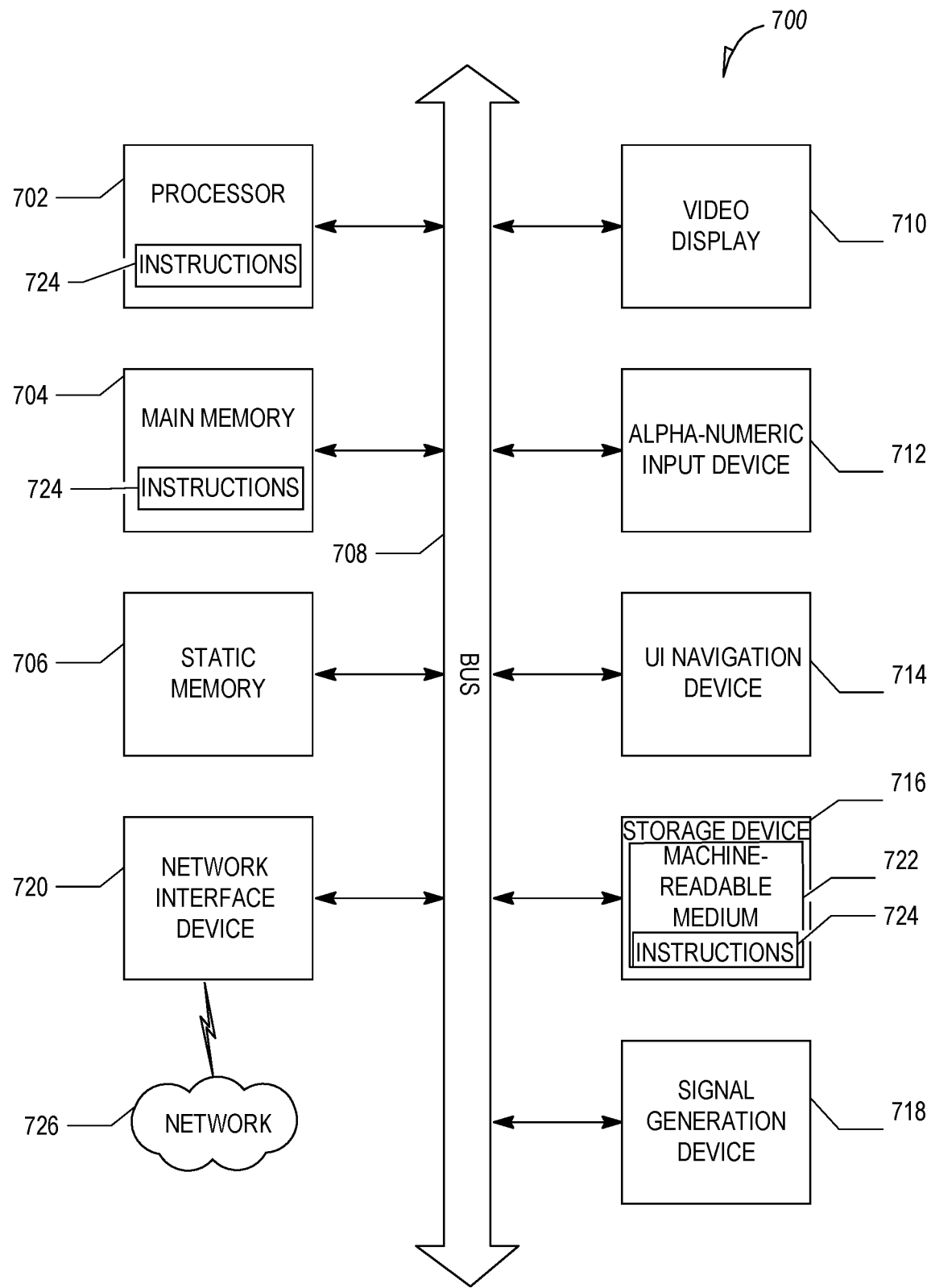
FIG. 7 is a block diagram illustrating a computing device hardware architecture.

FIG. 7 is a block diagram illustrating a computing device hardware architecture 700, within which a set or sequence of instructions can be executed to cause a machine to perform examples of any one of the methodologies discussed herein. The hardware architecture 700 describes a computing device for executing the vehicle autonomy system, described herein.

The architecture 700 may operate as a standalone device or may be connected (e.g., networked) to other machines. In a networked deployment, the architecture 700 may operate in the capacity of either a server or a client machine in server-client network environments, or it may act as a peer machine in peer-to-peer (or distributed) network environments. The architecture 700 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 700 includes a processor unit 702 comprising at least one processor (e.g., a central processing unit (CPU), a graphics processing unit (GPU), or both, processor cores, compute nodes). The architecture 700 may further comprise a main memory 704 and a static memory 706, which communicate with each other via a link 708 (e.g., a bus). The architecture 700 can further include a video display unit 710, an input device 712 (e.g., a keyboard), and a UI navigation device 714 (e.g., a mouse). In some examples, the video display unit 710, input device 712, and UI navigation device 714 are incorporated into a touchscreen display. The architecture 700 may additionally include a storage device 716 (e.g., a drive unit), a signal generation device 718 (e.g., a speaker), a network interface device 720, and one or more sensors (not shown), such as a Global Positioning System (GPS) sensor, compass, accelerometer, or other sensor.

In some examples, the processor unit 702 or another suitable hardware component may support a hardware interrupt. In response to a hardware interrupt, the processor unit 702 may pause its processing and execute an ISR, for example, as described herein.

The storage device 716 includes a machine-readable medium 722 on which is stored one or more sets of data structures and instructions 724 (e.g., software) embodying or used by any one or more of the methodologies or functions described herein. The instructions 724 can also reside, completely or at least partially, within the main memory 704, within the static memory 706, and/or within the processor unit 702 during execution thereof by the architecture 700, with the main memory 704, the static memory 706, and the processor unit 702 also constituting machine-readable media.

Executable Instructions and Machine-Storage Medium

The various memories (i.e., 704, 706, and/or memory of the processor unit(s) 702) and/or the storage device 716 may store one or more sets of instructions and data structures (e.g., the instructions 724) embodying or used by any one or more of the methodologies or functions described herein. These instructions, when executed by the processor unit(s) 702, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 can further be transmitted or received over a communications network 726 using a transmission medium via the network interface device 720 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A method for dispatching trips to a plurality of autonomous vehicles, the method comprising:
   accessing trip result data describing a plurality of trips that have been completed by a set of autonomous vehicles, the set of autonomous vehicles comprising a first autonomous vehicle of a first vehicle type and a second autonomous vehicle of a second vehicle type different than the first vehicle type;
   determining that a first trip of the plurality of trips comprises a first event, the first trip being executed by a first autonomous vehicle of the first vehicle type, the first event occurring while the first autonomous vehicle is located at a first route component having a first route component property;
   determining a first routing constraint for autonomous vehicles of the first vehicle type based at least in part on the first event occurring while the first autonomous vehicle is located at the first route component having the first route component property, the first routing constraint describing at least one factor for routing autonomous vehicles of the first vehicle type at route components having the first route component property;
   determining that a second trip of the plurality of trips comprises a second event, the second trip being executed by a second autonomous vehicle of the second vehicle type, the second event occurring while the second autonomous vehicle is located at a second route component having a second route component property;
   determining a second routing constraint for autonomous vehicles of the second vehicle type based at least in part on the second event occurring while the second autonomous vehicle is located at the second route component having the second route component property, the second routing constraint describing at least one factor for routing autonomous vehicles of the second vehicle type at route components having the second route component property;
   selecting an autonomous vehicle to execute a first new trip using the first routing constraint and the second routing constraint; and
   sending, to the selected autonomous vehicle, a request to execute the first new trip.

2. The method of claim 1, the method further comprising:
   generating a first route for at least part of the first new trip for execution by autonomous vehicles of the first vehicle type; and
   generating a second route for at least part of the first new trip for execution by autonomous vehicles of the second vehicle type, wherein the selecting of the autonomous vehicle is based at least in part on the first route and the second route.

3. The method of claim 1, wherein the first routing constraint describes a modification to at least one route component connection associated with the first route component.

4. The method of claim 1, wherein the first routing constraint describes a modification to at least one route component cost.

5. The method of claim 1, wherein the first event comprises disengaging a vehicle autonomy system during the first trip.

6. The method of claim 1, wherein the first event comprises receiving a customer rating for the first trip below a customer rating threshold.

7. The method of claim 1, wherein the first event comprises a deviation from a planned route for the first trip.

8. The method of claim 1, further comprising determining, using the trip result data, that a rate of events associated with route components having the first route component property is greater than a threshold.

9. The method of claim 1, further comprising detecting, using the trip result data, a first route component associated with an event for at least one of the plurality of trips, wherein the first routing constraint describes a routing graph modification associated with the first route component.

10. A system for dispatching trips to a plurality of autonomous vehicles, comprising:
    at least one processor programmed to perform operations comprising:
    accessing trip result data describing a plurality of trips that have been completed by a set of autonomous vehicles, the set of autonomous vehicles comprising a first autonomous vehicle of a first vehicle type and a second autonomous vehicle of a second vehicle type different than the first vehicle type;
    determining that a first trip of the plurality of trips comprises a first event, the first trip being executed by a first autonomous vehicle of the first vehicle type, the first event occurring while the first autonomous vehicle is located at a first route component having a first route component property;

determining a first routing constraint for autonomous vehicles of the first vehicle type based at least in part on the first event occurring while the first autonomous vehicle is located at the first route component having the first route component property, the first routing constraint describing at least one factor for routing autonomous vehicles of the first vehicle type at route components having the first route component property;

determining that a second trip of the plurality of trips comprises a second event, the second trip being executed by a second autonomous vehicle of the second vehicle type, the second event occurring while the second autonomous vehicle is located at a second route component having a second route component property;

determining a second routing constraint for autonomous vehicles of the second vehicle type based at least in part on the second event occurring while the second autonomous vehicle is located at the second route component having the second route component property, the second routing constraint describing at least one factor for routing autonomous vehicles of the second vehicle type at route components having the second route component property;

selecting an autonomous vehicle to execute a first new trip using the first routing constraint and the second routing constraint; and sending, to the selected autonomous vehicle, a request to execute the first new trip.

11. The system of claim 10, the operations further comprising:
generating a first route for at least part of the first new trip for execution by autonomous vehicles of the first vehicle type; and
generating a second route for at least part of the first new trip for execution by autonomous vehicles of the second vehicle type, wherein the selecting of the autonomous vehicle is based at least in part on the first route and the second route.

12. The system of claim 10, wherein the first routing constraint describes a modification to at least one route component connection associated with the first route component.

13. The system of claim 10, wherein the first routing constraint describes a modification to at least one route component cost.

14. The system of claim 10, wherein the first event comprises disengaging a vehicle autonomy system during the first trip.

15. The system of claim 10, wherein the first event comprises receiving a customer rating for the first trip below a customer rating threshold.

16. The system of claim 10, wherein the first event comprises a deviation from a planned route for the first trip.

17. The system of claim 10, the operations further comprising determining, using the trip result data, that a rate of events associated with route components having a first route component property is greater than a threshold.

18. A non-transitory machine-readable medium comprising instructions thereon that, when executed by at least one processor, cause the at least one processor to perform operations comprising:
accessing trip result data describing a plurality of trips that have been completed by a set of autonomous vehicles, the set of autonomous vehicles comprising a first autonomous vehicle of a first vehicle type and a second autonomous vehicle of a second vehicle type different than the first vehicle type;

determining that a first trip of the plurality of trips comprises a first event, the first trip being executed by a first autonomous vehicle of the first vehicle type, the first event occurring while the first autonomous vehicle is located at a first route component having a first route component property;

determining a first routing constraint for autonomous vehicles of the first vehicle type based at least in part on the first event occurring while the first autonomous vehicle is located at the first route component having the first route component property, the first routing constraint describing at least one factor for routing autonomous vehicles of the first vehicle type at route components having the first route component property;

determining that a second trip of the plurality of trips comprises a second event, the second trip being executed by a second autonomous vehicle of the second vehicle type, the second event occurring while the second autonomous vehicle is located at a second route component having a second route component property;

determining a second routing constraint for autonomous vehicles of the second vehicle type based at least in part on the second event occurring while the second autonomous vehicle is located at the second route component having the second route component property, the second routing constraint describing at least one factor for routing autonomous vehicles of the second vehicle type at route components having the second route component property;

selecting an autonomous vehicle to execute a first new trip using the first routing constraint and the second routing constraint; and sending, to the selected autonomous vehicle, a request to execute the first new trip.

19. The medium of claim 18, the operations further comprising:
generating a first route for at least part of the first new trip for execution by autonomous vehicles of the first vehicle type; and
generating a second route for at least part of the first new trip for execution by autonomous vehicles of the second vehicle type, wherein the selecting of the autonomous vehicle is based at least in part on the first route and the second route.

20. The medium of claim 18, wherein the first routing constraint describes a modification to at least one route component connection associated with the first route component.

* * * * *